United States Patent
Ryuu et al.

(10) Patent No.: US 9,323,108 B2
(45) Date of Patent: Apr. 26, 2016

(54) LIQUID CURABLE RESIN COMPOSITION, METHOD FOR MANUFACTURING IMAGE DISPLAY DEVICE USING SAME, AND IMAGE DISPLAY DEVICE

(71) Applicant: HITACHI CHEMICIAL COMPANY, LTD., Tokyo (JP)

(72) Inventors: Shunrin Ryuu, Chiba (JP); Youichi Kimura, Ibaraki (JP); Tetsuya Okazaki, Ibaraki (JP); Masayuki Wada, Ibaraki (JP); Junichi Kamei, Chiba (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/365,134

(22) PCT Filed: Dec. 12, 2012

(86) PCT No.: PCT/JP2012/082262
§ 371 (c)(1),
(2) Date: Jun. 13, 2014

(87) PCT Pub. No.: WO2013/089161
PCT Pub. Date: Jun. 20, 2013

(65) Prior Publication Data
US 2014/0368759 A1    Dec. 18, 2014

(30) Foreign Application Priority Data

Dec. 13, 2011  (JP) .................................. 2011-272611

(51) Int. Cl.
*G02F 1/1339* (2006.01)
*C08F 290/06* (2006.01)
(Continued)

(52) U.S. Cl.
CPC .......... *G02F 1/1339* (2013.01); *C08F 290/067* (2013.01); *C08L 75/16* (2013.01); *G02F 1/13338* (2013.01); *Y10T 428/31551* (2015.04)

(58) Field of Classification Search
None
See application file for complete search history.

(56) References Cited

U.S. PATENT DOCUMENTS 5,336,563 A * 8/1994 Coady et al. ................... 428/375
5,496,870 A * 3/1996 Chawla et al. .................. 522/90
(Continued)

FOREIGN PATENT DOCUMENTS

JP          5-11239 A      1/1993
JP       2004-58376 A      2/2004
(Continued)

OTHER PUBLICATIONS

Office Action mailed Dec. 23, 2015, for Chinese Application No. 201280061677.5.
Aronix, Toagosei Co., Ltd.

*Primary Examiner* — Robert S Loewe
(74) *Attorney, Agent, or Firm* — Fitch, Even, Tabin & Flannery LLP

(57) ABSTRACT

Provided is a liquid curable resin composition containing (A) a polymer component containing (A1) a polymer having an ethylenically unsaturated bond in a molecule thereof; (B) a low-molecular weight monomer having one ethylenically unsaturated group in a molecule thereof; and (C) a polymerization initiator, wherein the component (B) contains a compound represented by the following general formula (I). The liquid curable resin composition may be a material which is suitably applicable for the purpose of filling a space between a protective panel and an image display unit or the like in a large-sized image display device and which is excellent in moist heat resistance reliability.

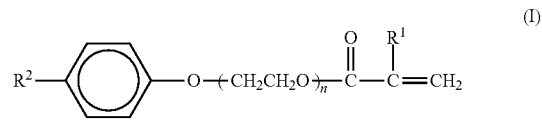

(In the formula, $R^1$ represents a hydrogen atom or a methyl group; $R^2$ represents an alkyl group having 4 or more carbon atoms; and n represents a number of from 1 to 20.)

18 Claims, 2 Drawing Sheets

(51) Int. Cl.
*C08L 75/16* (2006.01)
*G02F 1/1333* (2006.01)

(56) References Cited

U.S. PATENT DOCUMENTS

| | | | |
|---|---|---|---|
| 5,972,240 A * | 10/1999 | Kobayashi et al. | 252/299.01 |
| 6,288,136 B1 * | 9/2001 | Ukon et al. | 522/100 |
| 8,773,624 B2 * | 7/2014 | Shinya et al. | 349/122 |
| 2002/0101399 A1 * | 8/2002 | Kubo et al. | 345/104 |
| 2008/0287605 A1 * | 11/2008 | Sugawara et al. | 525/123 |
| 2012/0114953 A1 * | 5/2012 | Ogawa et al. | 428/423.1 |

FOREIGN PATENT DOCUMENTS

| | | | |
|---|---|---|---|
| JP | 2004-125868 A | 4/2004 | |
| JP | 2005-272495 A | 10/2005 | |
| JP | 2009-24160 A | 2/2009 | |
| WO | WO 2005090507 A1 * | 9/2005 | C09J 151/08 |
| WO | 2011/010599 A1 | 1/2011 | |

* cited by examiner

LIQUID CURABLE RESIN COMPOSITION, METHOD FOR MANUFACTURING IMAGE DISPLAY DEVICE USING SAME, AND IMAGE DISPLAY DEVICE

TECHNICAL FIELD

The present invention relates to a liquid curable resin composition, a method for manufacturing an image display device using same, and an image display device.

BACKGROUND ART

As representative image display devices, liquid crystal display devices are exemplified. The liquid crystal display device includes a liquid crystal panel composed of a transparent electrode, a liquid crystal cell in which a liquid crystal is filled and sealed between glass substrates having a pixel pattern or the like formed on a surface thereof and having a thickness of about 1 mm via a gap having about several microns, a polarizing plate stuck on each outside surface thereof, and a light source such as a backlight system, etc.

The polarizing plate configuring this liquid crystal panel is thin and easily scratched, and therefore, in particular, in mobile phones, game machines, digital cameras, onboard applications, and the like, liquid crystal display devices having a structure in which a transparent front plate (protective panel) is provided leaving a specific space on the front surface of the liquid crystal panel are generally used.

Furthermore, in recent years, in mobile phones, game machines, digital cameras, onboard parts, notebook computers, desktop computers, computer monitors, and the like, touch panels have been mounted. In the case of such a liquid crystal display device, a laminate structure in which a protective panel, a touch panel, and a liquid crystal panel are laminated in this order is adopted, and a specific space is existent between the protective panel and the touch panel and between the touch panel and the liquid crystal panel, respectively.

In the case where the space in the above-described liquid crystal display device is air, this space is a cause of generating scattering of light. Owing to this, the contrast, luminance, or transmittance is lowered, and furthermore, a lowering of the image quality may possibly occur due to ghost.

As a method of preventing such scattering of light, PTL 1 proposes a method of filling an oily material in a space between a protective panel and a liquid crystal panel; and PTL 2 proposes a method of allowing a sheet obtained by copolymerizing an acrylic monomer to intervene between a protective panel and a liquid crystal panel.

In addition, in a plasma display panel (PDP) that is one of flat panel displays (FPD), in order to prevent cracking of PDP, a space of from about 1 to 5 mm far from PDP is provided, and a protective panel having a thickness of about 3 mm, such as glass, etc., is provided on the front surface (viewing surface side).

As a method of preventing such cracking of display or preventing such scattering of light or the like, PTLs 3 and 4 propose a method of allowing an optical film composed of a specified resin to intervene in a space between a protective panel and an image display unit such as a plasma display plate, a liquid crystal panel, etc., a space between a protective panel and a touch panel, and a space between a touch panel and an image display unit (hereinafter also collectively referred to as "space between a protective panel and an image display unit or the like").

CITATION LIST

Patent Literature

PTL 1: JP-A-H5-011239
PTL 2: JP-A-2004-125868
PTL 3: JP-A-2004-058376
PTL 4: JP-A-2009-024160

SUMMARY OF INVENTION

Technical Problem

However, the oily material which is used in PTL 1 is difficult to be sealed for the purpose of preventing leakage and includes a possibility of damaging materials used in the liquid crystal panel. Furthermore, there is involved such a problem that in the case where the protective panel is cracked, the oily material leaks out.

In addition, the optical film composed of a resin, which is disclosed in PTL 3, encounters such a problem that after being applied to a display, when a short-time moist heat resistance test is carried out, the optical film becomes cloudy.

Furthermore, in the optical films (sheets) disclosed in PTLs 2 and 4, when applied to image display devices such as more large-sized liquid crystal display devices, etc., there is room for improvement. That is, it is difficult to uniformly fabricate a large-area optical film suited to a large-sized image display device, and furthermore, even if such an optical film would be able to be fabricated, it is difficult to laminate the large-area optical film uniformly on the large-sized image display device. If the optical film cannot be uniformly laminated, inconvenience such as color unevenness, etc. may be possibly caused.

The present invention aims to provide a liquid curable resin composition which may be suitably applied for the purpose of filling a space between a protective panel and an image display unit or the like in a large-sized image display device and which is excellent in transparency and moist heat resistance reliability, a method for manufacturing an image display device using the subject composition, and an image display device.

Solution to Problem

In view of the above-described problems, the present inventors have found that a liquid curable resin composition containing specified components is excellent in transparency and moist heat resistance reliability of a cured material obtained through curing and may also control a curing shrinkage ratio to a low level.

Specifically, the present invention provides the following [1] to [4].

[1] A liquid curable resin composition comprising
(A) a polymer component containing (A1) a polymer having an ethylenically unsaturated bond in a molecule thereof;
(B) a low-molecular weight monomer having one ethylenically unsaturated group in a molecule thereof; and
(C) a polymerization initiator, wherein
the component (B) contains a compound represented by the following general formula (I):

[Chem. 1]

(In the formula, $R^1$ represents a hydrogen atom or a methyl group; $R^2$ represents an alkyl group having 4 to 12 carbon atoms; and n represents a number of 1 to 20.)

[2] A method for manufacturing an image display device provided with an image display unit and a protective panel, which comprises a step of allowing the liquid curable resin composition as set forth above in [1] to intervene between the image display unit and the protective panel; and a step of irradiating the side of the protective panel with a light, thereby curing the liquid curable resin composition.

[3] A method for manufacturing an image display device provided with an image display unit, a touch panel, and a protective panel, which comprises a step of allowing the liquid curable resin composition as set forth above in [1] to intervene at least between the image display unit and the touch panel or between the touch panel and the protective panel; and a step of irradiating the side of the protective panel with a light, thereby curing the liquid curable resin composition.

[4] An image display device manufactured by the manufacturing method as set forth above in [2] or [3].

Advantageous Effects of Invention

Since the liquid curable resin composition of the present invention is excellent in transparency and moist heat resistance reliability of a cured material obtained through curing and may also control a curing shrinkage ratio to a low level, it may be suitably applied as a material for the purpose of filling a space between a protective panel and an image display unit or the like in a large-sized image display device.

In addition, according to the method for manufacturing an image display device of the present invention, it is possible to provide an image display device which is able to reduce a stress given to an image display unit and has impact resistance and from which a ghost-free, clear and high-contrast image is obtainable.

DESCRIPTION OF EMBODIMENTS

Embodiments of the present invention are hereunder described by reference to the accompanying drawings, but it should not be construed that the present invention is limited to these embodiments. It is to be noted that in the drawings, the same or equivalent elements are designated by the same symbols, and their redundant description is omitted.

In addition, a "(meth)acrylate" as referred to in the present specification means an "acrylate" and a "methacrylate" corresponding thereto. Similarly, a "(meth)acryl" as referred to herein means an "acryl" and a "methacryl" corresponding thereto, and a "(meth)acryloyl" as referred to herein means an "acryloyl" and a "methacryloyl" corresponding thereto (the same is also applicable to other synonyms).

[Liquid Curable Resin Composition]

The liquid curable resin composition of the present invention (hereinafter also referred to simply as "resin composition") comprises (A) a polymer component containing (A1) a polymer having an ethylenically unsaturated bond in a molecule thereof, (B) a low-molecular weight monomer having one ethylenically unsaturated group in a molecule thereof, and (C) a polymerization initiator, wherein the component (B) contains a compound represented by the foregoing general formula (I).

It is to be noted that the "liquid curable resin composition" as referred to in the present invention means a resin composition that is liquid at 25° C. and which is curable with radiation of light, heat, or the like.

In addition, a "polymer" as referred to in the present invention means a compound having a weight average molecular weight of 3,000 or more, and a "low-molecular weight monomer" as referred to herein means a compound having a weight average molecular weight of less than 3,000.

Since such a liquid curable resin composition contains specified components, a cured material obtained through curing is excellent in transparency and moist heat resistance reliability, and also, since the liquid curable resin composition contains, as the component (B), a compound having a specified structure represented by the general formula (I), its curing shrinkage ratio can be controlled to a low level. For that reason, the resin composition of the present invention is able to suppress a warp or the like of a substrate, which may be caused when cured by light or heat, and may be suitably used for filling a space between a protective panel and an image display unit or the like in a large-sized image display device.

Furthermore, since the resin composition of the present invention contains the component (B), it is existent in a liquid state, and thus, it can be uniformly filled in a space between a protective panel and an image display unit or the like.

It is to be noted that according to knowledge of the present inventors, a film and a liquid curable resin composition as a material which is used for filling a space between a protective panel and an image display unit or the like differ from each other in terms of a required performance. For that reason, it is difficult to apply the material in the film to the liquid curable resin composition as it is.

From the viewpoints of workability and suppression of voids (air bubbles which may be possibly generated in the curable resin composition), it is preferable that the resin composition of the present invention does not substantially contain an organic solvent.

It is meant by the terms "not substantially contain an organic solvent" as referred to herein that an organic solvent is not intentionally added, and so long as the properties of the present invention are not remarkably lowered, a trace amount of an organic solvent may exist. Specifically, the content of the organic solvent may be not more than 1,000 ppm relative to the total amount of the resin composition, and it is preferably not more than 500 ppm, and more preferably not more than 100 ppm. It is still more preferable that an organic solvent is not contained at all. It is to be noted that the "organic solvent" as referred to herein means an organic compound which does not have an ethylenically unsaturated group in a molecule thereof, is liquid at 25° C., and has a boiling point at atmospheric pressure of not higher than 250° C.

In addition, from the viewpoints of workability and suppression of voids, the viscosity of the resin composition of the present invention at 25° C. is preferably from 500 to 5,000 mPa·s, more preferably from 1,000 to 4,000 mPa·s, and still more preferably from 2,000 to 3,500 mPa·s. When the subject viscosity is 500 mPa·s or more, the generation of voids can be thoroughly suppressed. In addition, when the subject viscosity is not more than 5,000 mPa·s, the workability is good, and also, the resin composition can be made liquid at 25° C.

It is to be noted that the viscosity at 25° C. is a value measured with an E-type viscometer (trade name: RE-80L, manufactured by Toki Sangyo Co., Ltd.) using a cone rotor (3°×R17.65) at a number of revolution of 1 rpm, and specifically, it is a value on the basis of a measuring method described in the Examples.

Each of the components is hereunder described.

<Component (A): Polymer Component Containing (A1) a Polymer Having an Ethylenically Unsaturated Bond in a Molecule Thereof>

The component (A) is a polymer component containing (A1) a polymer having an ethylenically unsaturated bond in a molecule thereof. It is to be noted that the polymer component as the component (A) may be a component composed of only (A1) a polymer having an ethylenically unsaturated bond in a molecule thereof, or may be a component containing a polymer not having an ethylenically unsaturated bond in a molecule thereof in addition to the component (A1).

In addition, the weight average molecular weight of the polymer component as the component (A) is generally 3,000 or more.

From the viewpoints of curing properties, moist heat resistance reliability, and workability, the weight average molecular weight of the component (A) is preferably from 3,000 to 40,000, more preferably from 4,000 to 30,000, still more preferably from 5,000 to 20,000, and yet still more preferably from 6,000 to 10,000.

When the weight average molecular weight is 3,000 or more, sufficient curing properties are obtained, and the cured material is excellent in moist heat resistance reliability. Meanwhile, when the weight average molecular weight is not more than 40,000, the workability becomes good, too.

Examples of the polymer having an ethylenically unsaturated bond in a molecule thereof, that is the component (A1), include urethane polymers having a (meth)acryloyl group, polyester oligomers having a (meth)acryloyl group, polyethylene glycol mono(meth)acrylate, polyethylene glycol di(meth)acrylate, polypropylene glycol mono(meth)arylate, and polypropylene glycol di(meth)acrylate.

Of these, from the viewpoint of enhancing toughness and adhesiveness of a cured material of the resin composition, urethane polymers having a (meth)acryloyl group are preferable.

The above-described urethane polymers having a (meth)acryloyl group can be, for example, obtained by allowing a compound which is obtained by allowing (a1) a diol compound and (a2) a compound having an isocyanate group to react with each other (this compound will be also referred to as "urethane polymer") to react with (a3) a monohydroxy (meth)acrylate or (a4) a monocarboxylic acid having a (meth)acryloyl group or a monoisocyanate compound having a (meth)acryloyl group.

Examples of the diol compound (a1) include polyether diols such as polyethylene glycol, polypropylene glycol, polytetramethylene glycol, etc.; polyolefin diols such as polybutadiene diol, polyisoprene diol, hydrogenated polybutadiene diol, hydrogenated polyisoprene diol, etc.; polyester diols, polycaprolactone diol, silicone diol, and the like.

Of these, from the viewpoints of relaxation properties of stress and impact, transparency, adhesiveness, and compatibility with other components, polyether diols are preferable.

Examples of the compound (a2) having an isocyanate group include a diisocyanate compound represented by the following general formula (2) and the like. It is to be noted that as the component (a2), a trifunctional or polyfunctional isocyanate compound may be used in combination with the diisocyanate compound represented by the following general formula (2).

[Chem. 2]

OCN—X—NCO    (2)

(In the formula (2), X represents a divalent organic group.)

Examples of the divalent organic group represented by X in the foregoing general formula (2) include an aliphatic group having 1 to 20 carbon atoms, an alicyclic group having 5 to 20 carbon atoms, an arylene group such as a phenylene group or a naphthylene group which may be unsubstituted or substituted with a lower alkyl group having 1 to 5 carbon atoms, etc., and the like.

Of these, from the viewpoint of more enhancing the transparency, an aliphatic group having 1 to 20 carbon atoms or an alicyclic group having 5 to 20 carbon atoms is preferable, and an alicyclic group having 5 to 20 carbon atoms is more preferable.

It is to be noted that the above-described aliphatic group having 1 to 20 carbon atoms is preferably an aliphatic hydrocarbon group having 1 to 20 carbon atoms.

Examples of the diisocyanate compound represented by the foregoing general formula (2) include diphenylmethane diisocyanate compounds such as diphenylmethane-2,4'-diisocyanate, 3,2'-, 3,3'-, 4,2'-, 5,2'-, 5,3'-, 6,2'- or 6,3'-dimethyldiphenylmethane-2,4'-diisocyanate, 3,2'-, 3,3"-, 4,2"-, 4,3'-, 5,2'-, 5,3'-, 6,2'- or 6,3'-diethyldiphenylmethane-2,4'-diisocyanate, 3,2'-, 3,3'-, 4,2'-, 4,3'-, 5,2'-, 5,3'-, 6,2'- or 6,3'-dimethoxydiphenylmethane-2,4'-diisocyanate, diphenylmethane-4,4'-diisocyanate, diphenylmethane-3,3'-diisocyanate, diphenylmethane-3,4'-diisocyanate, etc., and hydrogenated products thereof; aromatic diisocyanates such as diphenyl ether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylene diisocyanate, p-xylylene diisocyanate, 1,5-naphthalene diisocyanate, 4,4'-[2,2-bis(4-phenoxyphenyl)propane]diisocyanate, tolylene diisocyanate, etc.; and aliphatic or alicyclic diisocyanates such as hexamethylene diisocyanate, 2,2,4-trimethylhexamethylene diisocyanate, 2,4,4-trimethylhexamethylene diisocyanate, isophorone diisocyanate, 4,4'-dicyclohexylmethane diisocyanate, trans-cyclohexane-1,4-diisocyanate, hydrogenated m-xylylene diisocyanate, lysine diisocyanate, etc.

Of these, from the viewpoint of more enhancing the transparency, aliphatic or alicyclic diisocyanate compounds represented by the general formula (2) wherein X is a group having an aliphatic group having 1 to 20 carbon atoms or an alicyclic group having 5 to 20 carbon atoms are preferable.

It is to be noted that these diisocyanate compounds can be used solely or in combination of two or more kinds thereof.

In addition, from the viewpoint of avoiding a daily change, it is preferable to use a compound stabilized with a blocking agent as the diisocyanate compound represented by the foregoing general formula (2).

Though the blocking agent is not particularly limited, examples thereof include a hydroxy acrylate, an alcohol such as butanol, etc., a phenol, an oxime, and the like.

A blending proportion at the time of allowing the component (a1) and the component (a2) to react with each other is properly regulated depending upon the number average molecular weight of the urethane polymer to be produced and whether an end of the urethane polymer to be produced is made a hydroxyl group or an isocyanate group.

In the case where the end of the urethane polymer is made an isocyanate group, it is preferable to regulate the blending proportion so that the ratio of the number of isocyanate groups to the number of hydroxyl groups (number of isocyanate groups/number of hydroxyl groups) is 1.01 or more. From the viewpoint of making the number average molecular weight large, it is preferable to regulate the subject ratio to less than 2. By regulating the ratio to such a range, a urethane polymer in which an end thereof is an isocyanate group is prepared.

In the case where the end of the urethane polymer is an isocyanate group, a compound which is reactive with the isocyanate group, such as (a3) an monohydroxy (meth)acrylate, etc., can be used as the compound for introducing a (meth)acryloyl skeleton.

Examples of the monohydroxy (meth)acrylate (a3) include 2-hydroxyethyl (meth)acrylate, 2-hydroxypropyl (meth) acrylate, 4-hydroxybutyl (meth)acrylate, 1,4-cyclohexanedimethanol mono (meth)acrylate, caprolactone or alkylene oxide adducts of the above-described respective (meth) acrylates, glycerin di(meth)acrylate, trimethylol di(meth) acrylate, pentaerythritol tri (meth)acrylate, dipentaerythritolpenta(meth)acrylate, ditrimethylolpropane tri(meth)acrylate, and 2-acryloxyethanol. These compounds can be used solely or in combination of two or more kinds thereof.

Meanwhile, in the case where the end of the urethane polymer is made a hydroxyl group, it is preferable to regulate the blending proportion so that the ratio of the number of hydroxyl groups to the number of isocyanate groups (number of hydroxyl groups/number of isocyanate groups) is 1.01 or more. From the viewpoint of making the number average molecular weight large, it is preferable to regulate the subject ratio to less than 2.

In the case where the end of the urethane polymer is a hydroxyl group, a compound which is reactive with the hydroxyl group, such as (a4) a monocarboxylic acid having a (meth)acryloyl group or a monoisocyanate compound having a (meth)acryloyl group, etc., can be used as the compound for introducing a (meth)acryloyl skeleton.

Examples of the monocarboxylic acid having a (meth) acryloyl group include (meth)acrylic acid and the like.

In addition, examples of the monoisocyanate compound having a (meth)acryloyl group include 2-isocyanatoethyl (meth)acrylate and the like.

It is to be noted that the urethane polymer having a (meth) acryloyl group can also be manufactured by a method other than the above-described method. As the method for manufacturing a urethane polymer having a (meth)acryloyl group, other than the above-described method, for example, the urethane polymer having a (meth)acryloyl group can also be obtained by mixing prescribed amounts of the respective diol compound (a1) and monohydroxy (meth)acrylate (a3), increasing the temperature to a prescribed temperature, and then adding a prescribed amount of the compound (a2) having an isocyanate group over a prescribed time to the mixture of the component (a1) and the component (a3), thereby carrying out the reaction.

In addition, the polymer (A1) having an ethylenically unsaturated bond in a molecule thereof in the component (A) can be manufactured by a conventionally known method using the above-described components, for example, a method of allowing the above-described components to react with each other in the presence of a polymerization inhibitor such as p-methoxyphenol, etc. and a catalyst such as dibutyltin dilaurate, etc.

From the viewpoints that the viscosity of the resin composition can be regulated and that the curing shrinkage ratio can be more reduced, an average number of functional groups in the component (A) is preferably from 0.3 to 2.0, more preferably from 0.4 to 1.5, and still more preferably from 0.5 to 1.0.

The "number of functional groups" as referred to herein represents the number of functional groups ((meth)acryloyl group) in one molecule of the polymer component of the component (A), and the "average number of functional groups" as referred to herein represents an average value of the number of functional groups (number of (meth)acryloyl groups) per molecule in the whole of the component (A). The average number of functional groups can be calculated from the molar number of each of the constituent components at the time of synthesizing the component (A). In addition, the average number of functional groups can also be calculated from an integrated value of $^1$H-NMR of the component (A).

It is to be noted that in the case where the average number of functional groups is less than 1.0, the component (A) also contains a polymer having the same structure as in the component (A1) except for not having an ethylenically unsaturated bond in a molecule thereof, together with the polymer (A1) having an ethylenically unsaturated bond in a molecule thereof. The subject polymer serves a function as a plasticizer in the resin composition and regulates the viscosity of the resin composition to an appropriate range.

Here, in the present invention, in the case where a polymer not having an ethylenically unsaturated bond is also produced at the time of synthesis of a polymer having an ethylenically unsaturated bond, it is to be construed that a mixture of the polymer (A1) having an ethylenically unsaturated bond and the polymer not having an ethylenically unsaturated bond is also included in the component (A).

Examples of the polymer component which is corresponding to the component (A) other than the component (A1) include acrylic polymers.

Examples of the subject acrylic polymer include polymers manufactured by subjecting a polymerizable compound having a (meth)acryloyl group to radical polymerization; and polymers obtained by copolymerizing one or two or more kinds of polymerizable monomers such as styrene, a polymerizable styrene derivative substituted at the α-position or on the aromatic ring, e.g., vinyltoluene, α-methylstyrene, etc., a vinyl alkyl ether, an ester of vinyl alcohol, etc.

Examples of the above-described polymerizable compound having a (meth)acryloyl group include an alkyl (meth) acrylate, benzyl (meth)acrylate, (meth)acrylamide, (meth) acrylonitrile, tetrahydrofurfuryl (meth)acrylate, dimethylaminoethyl (meth)acrylate, diethylaminoethyl (meth)acrylate, glycidyl (meth)acrylate, 2,2,2-trifluoroethyl (meth)acrylate, 2,2,3,3-tetrafluoropropyl (meth)acrylate, and a compound having a (meth)acryloyl group and a hydroxyl group or an ether bond in a molecule thereof.

As the component (A), a polymer composed of only the component (A1) and a polymer mixture containing the component (A1) and a polymer having the same structure as in the component (A1) except for not having an ethylenically unsaturated bond in a molecule thereof are preferable; and a polymer composed of only the component (A1) and a polymer mixture composed of the component (A1) and a polymer having the same structure as in the component (A1) except for not having an ethylenically unsaturated bond in a molecule thereof are more preferable.

A total content of the component (A1) and the polymer having the same structure as in the component (A1) except for not having an ethylenically unsaturated bond in a molecule thereof is preferably from 70 to 100% by mass, more preferably from 85 to 100% by mass, still more preferably from 95 to 100% by mass, and yet still more preferably substantially 100% by mass relative to the total amount of the component (A).

From the viewpoints of curing properties, adhesion, and curing shrinkage ratio, the content of the component (A) in the resin composition of the present invention is preferably from 60 to 95% by mass, more preferably from 70 to 93% by mass, still more preferably from 75 to 92% by mass, and yet still more preferably from 80 to 90% by mass relative to the total amount of the whole components in the resin composition.

It is to be noted that in the present specification, the weight average molecular weight is a value obtained through measurement by means of gel permeation chromatography (GPC) and calculation using a calibration curve of standard polystyrene, and specifically, it means a value measured on the basis of a method described in the Examples.

<Component (B): Low-Molecular Weight Monomer Having One Ethylenically Unsaturated Group in a Molecule Thereof>

The component (B) is a low-molecular weight monomer having one ethylenically unsaturated group in a molecule thereof, and a weight average molecular weight of the subject low-molecular weight monomer is generally less than 3,000.

The weight average molecular weight of the component (B) is preferably from 100 to 2,800, more preferably from 150 to 2,000, and still more preferably from 200 to 1,500.

The low-molecular weight monomer having one ethylenically unsaturated group in a molecule thereof, that is the component (B), is preferably liquid at normal temperature (25° C.), and in the present invention, the component (B) contains a compound represented by the following general formula (I).

[Chem. 3]

(I)

In the foregoing general formula (I), $R^1$ represents a hydrogen atom or a methyl group; $R^2$ represents an alkyl group having 4 or more carbon atoms; and n represents a number of from 1 to 20.

$R^2$ is an alkyl group having 4 or more carbon atoms. The carbon number of the subject alkyl group is preferably from 4 to 12, more preferably from 5 to 11, and still more preferably from 6 to 10. When the carbon number of the alkyl group is less than 4 it is not preferable because curing shrinkage properties become stronger. Meanwhile, when the carbon number of the alkyl group is not more than 12, the compatibility with the component (A) becomes good.

n is corresponding to an average value of the addition molar number of ethylene oxide.

n is a positive number of from 1 to 20, and from the viewpoint of controlling curing shrinkage properties to a low level, n is preferably from 3 to 20, more preferably from 4 to 20, and still more preferably from 7 to 20.

It is to be noted that when n is more than 20 it is not preferable because the viscosity becomes excessively high, or the compound does not become liquid at normal temperature but becomes solid, so that it becomes difficult to prepare it as a liquid curable resin composition.

Examples of the compound represented by the foregoing general formula (I) include butylphenoxy polyethylene glycol (meth)acrylate, pentylphenoxy polyethylene glycol (meth)acrylate, hexylphenoxy polyethylene glycol (meth)acrylate, heptylphenoxy polyethylene glycol (meth)acrylate, octylphenoxy polyethylene glycol (meth)acrylate, nonylphenoxy polyethylene glycol (meth)acrylate, decylphenoxy polyethylene glycol (meth)acrylate, and the like. These compounds can be used solely or in combination of two or more kinds thereof.

It is to be noted that a compound represented by the foregoing general formula (I) wherein $R^1$ is a hydrogen atom, $R^2$ is a nonyl group, and an average value of n is 4 is commercially available as FA-314A (trade name, manufactured by Hitachi Chemical Company, Ltd.); and that a compound represented by the foregoing general formula (I) wherein $R^1$ is a hydrogen atom, $R^2$ is a nonyl group, and an average value of n is 8 is commercially available as FA-318A (trade name, manufactured by Hitachi Chemical Company, Ltd.).

In addition, the component (B) may contain a low-molecular weight monomer having one ethylenically unsaturated group in a molecule thereof other than the compound represented by the foregoing general formula (I).

Examples of such a low-molecular weight monomer include an alkyl (meth)acrylate represented by the following general formula (3) (hereinafter also referred to as "component (B1)"), a compound having a (meth)acryloyl group and a hydroxyl group or an ether bond in a molecule thereof (hereinafter also referred to as "component (B2)"), and the like.

[Chem. 4]

(3)

In the foregoing general formula (3), $R^{11}$ represents a hydrogen atom or a methyl group, and $R^{12}$ represents an alkyl group having 4 to 20 carbon atoms. From the viewpoint of more imparting flexibility, $R^{12}$ is preferably an alkyl group having 6 to 18 carbon atoms, and more preferably an alkyl group having 8 to 16 carbon atoms.

(Component (B1))

Examples of the alkyl (meth)acrylate represented by the foregoing general formula (3) include n-butyl (meth)acrylate, tert-butyl (meth)acrylate, isobutyl (meth)acrylate, n-pentyl (meth)acrylate, n-octyl (meth)acrylate, isooctyl (meth)acrylate, 2-ethylhexyl (meth)acrylate, isodecyl (meth)acrylate, n-hexyl (meth)acrylate, stearyl (meth)acrylate, lauryl (meth)acrylate, tridecyl (meth)acrylate, and the like. These compounds can be used solely or in combination of two or more kinds thereof.

(Component (B2))

Examples of the compound having a (meth)acryloyl group and a hydroxyl group or an ether bond in a molecule thereof include hydroxyl group-containing (meth)acrylates such as 2-hydroxyethyl (meth)acrylate, 1-hydroxyethyl (meth)acrylate, 2-hydroxypropyl (meth)acrylate, 3-hydroxypropyl (meth)acrylate, 1-hydroxypropyl (meth)acrylate, 4-hydroxybutyl (meth)acrylate, 3-hydroxybutyl (meth)acrylate, 2-hydroxybutyl (meth)acrylate, 1-hydroxybutyl (meth)acrylate, etc.; hydroxy group-containing (meth)acrylamides such as hydroxyethyl (meth)acrylamide, etc.; mono(meth)acrylates of a polyethylene glycol, e.g., diethylene glycol, triethylene glycol, etc.; mono(meth)acrylates of a polypropylene glycol, e.g., dipropylene glycol, tripropylene glycol, etc.; mono (meth)acrylates of a polybutylene glycol, e.g., dibutylene glycol, tributylene glycol, etc.; and morpholine group-containing (meth)acrylates such as acryloylmorpholine, etc.

Of these, from the viewpoints of moist heat resistance reliability and workability at the time of coating, hydroxyl group-containing (meth)acrylates and morpholine group-containing (meth)acrylates are preferable, and 4-hydroxybutyl acrylate and acryloyl morpholine are more preferable.

These compounds may be used solely or in combination of two or more kinds thereof.

The content of the component (B) in the resin composition of the present invention is preferably from 5 to 40% by mass, more preferably from 6 to 30% by mass, still more preferably from 7 to 25% by mass, and yet still more preferably from 9 to 20% by mass relative to the total amount of the whole components in the resin composition.

When the content of the component (B) is 5% by mass or more, a resin composition having an appropriate viscosity can be realized, the workability at the time of coating can be made good, and the curing shrinkage ratio can be made low. In addition, when the content of the component (B) is not more than 40% by mass, the curing shrinkage ratio does not become high.

The content of the compound represented by the foregoing general formula (I) in the component (B) is preferably from 35 to 100% by mass, more preferably from 50 to 100% by mass, still more preferably from 70 to 100% by mass, yet still more preferably from 85 to 100% by mass, and even yet still more preferably substantially 100% by mass relative to the total amount of the component (B).

<Component (C): Polymerization Initiator>

As the polymerization initiator (C) which is used in the present invention, any of (C1) a photopolymerization initiator and (C2) a thermopolymerization initiator can be used, and these may be used in combination.

Examples of the photopolymerization initiator (C1) which can be used in the present invention include known photopolymerization initiators such as benzophenone-based compounds, anthraquinone-based compounds, benzoin-based compounds, sulfonium salts, diazonium salts, onium salts, and the like. These materials have sensitivity particularly to ultraviolet rays.

Specific examples of the photopolymerization initiator (C1) include aromatic ketone compounds such as benzophenone, N,N'-tetramethyl-4,4'-diaminobenzophenone (Michler's ketone), N,N-tetraethyl-4,4'-diaminobenzophenone, 4-methoxy-4'-dimethylaminobenzophenone, α-hydroxyisobutylphenone, 2-ethylanthraquinone, t-butylanthraquinone, 1,4-dimethylanthraquinone, 1-chloroanthraquinone, 2,3-dichloroanthraquinone, 3-chloro-2-methylanthraquinone, 1,2-benzoanthraquinone, 2-phenylanthraquinone, 1,4-naphthoquinone, 9,10-phenanthraquinone, thioxanthone, 2-chlorothioxanthone, 1-hydroxycyclohexyl phenyl ketone, 2,2-dimethoxy-1,2-diphenylethan-1-one, 2-hydroxy-2-methyl-1-phenylpropan-1-one, etc., benzoin compounds such as benzoin, methylbenzoin, ethylbenzoin, etc., benzoin ether compounds such as benzoin methyl ether, benzoin ethyl ether, benzoin isobutyl ether, benzoin phenyl ether, etc., benzyl, 2,2-diethoxyacetophenone, benzyl dimethyl ketal, acridine compounds such as ester compounds of β-(acridin-9-yl)acrylic acid, 9-phenylacridine, 9-pyridylacridine, 1,7-diacridinoheptane, etc., 2,4,5-triarylimidazole dimers such as 2-(o-chlorophenyl)-4,5-diphenylimldazole dimer, 2-(o-chlorophenyl)-4,5-di(m-methoxyphenyl)imidazole dimer, 2-(o-fluorophenyl)-4,5-diphenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, 2-(p-methylmercaptophenyl)-4,5-diphenylimidazole dimer, etc., 2-benzyl-2-dimethylamino-1-(4-morpholinophenyl)-1-butanone, 2-methyl-1-[4-(methylthio)phenyl]-2-morpholino-1-propane, bis(2,4,6-trimethylbenzoyl)-phenylphosphine oxide, oligo(2-hydroxy-2-methyl-1-(4-(1-methylvinyl)phenyl)propanone), and the like.

In addition, in particular, as the photopolymerization initiator which does not cause coloration of the curable resin composition and enhances the transparency, α-hydroxyalkyl phenone-based compounds such as 1-hydroxycyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, etc., acylphosphine oxide-based compounds such as bis(2,4,6-trimethylbenzoyl)-phenylphosphine oxide, bis(2,6-dimethoxybenzoyl)-2,4,4-trimethyl-pentylphoshine oxide, 2,4,6-trimethylbenzoyl-diphenylphosphine oxide, etc., oligo(2-hydroxy-2-methyl-1-(4-(1-methylvinyl)phenyl) propanone), and combinations thereof are preferable.

In addition, as the photopolymerization initiator for fabricating a thick film, acylphosphine oxide-based compounds such as bis(2,4,6-trimethylbenzoyl)-phenylphosphine oxide, bis(2,6-dimethoxybenzoyl)-2,4,4-trimethyl-pentylphoshine oxide, 2,4,6-trimethylbenzoyl-diphenylphosphine oxide, etc. are preferable.

These photopolymerization initiators (C1) may be used solely or in combination of two or more kinds thereof.

The thermopolymerization initiator (C2) is an initiator that generates a radical by heat.

Specific examples of the thermopolymerization initiator (C2) include organic peroxides such as benzoyl peroxide, t-butyl perbenzoate, cumene hydroperoxide, diisopropylperoxy dicarbonate, di-n-propylperoxy dicarbonate, di(2-ethoxyethyl)peroxy dicarbonate, t-butylperoxy neodecanoate, t-butylperoxy pivalate, t-hexylperoxy pivalate, (3,5,5-trimethylhexanoyl)peroxide, dipropionyl peroxide, lauroyl peroxide, and diacetyl peroxide; and azo-based compounds such as 2,2'-azobisisobutyronitrile, 2,2'-azobis(2-methylbutyronitrile), 1,1'-azobis(cyclohexane-1-carbonyl), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

These thermopolymerization initiators (C2) may be used solely or in combination of two or more kinds thereof.

The content of the polymerization initiator (C) in the resin composition of the present invention is preferably from 0.01 to 5% by mass, more preferably from 0.02 to 3% by mass, and still more preferably from 0.03 to 2% by mass relative to the total amount of the whole components in the resin composition.

It is to be noted that in the case of using the photopolymerization initiator (C1) as the component (C), the content of the photopolymerization initiator (C1) is preferably from 0.1 to 5% by mass, more preferably from 0.2 to 3% by mass, and still more preferably from 0.3 to 2% by mass relative to the total amount of the whole components in the resin composition.

Meanwhile, in the case of using the thermopolymerization initiator (C2) as the component (C), the content of the thermopolymerization initiator (C2) is preferably from 0.01 to 1% by mass relative to the total amount of the whole components in the resin composition.

It is to be noted that when the photopolymerization initiator (C1) and the thermopolymerization initiator (C2) are used in combination, it is preferable that those initiators are used within the foregoing ranges, respectively.

[Curing Reaction of Liquid Curable Resin Composition]

The curing reaction can be carried out by a curing reaction by irradiation with active energy rays, a curing reaction by heat, or a combination thereof. The active energy rays as referred to herein mean ultraviolet rays, electron beams, α-rays, β-rays, or the like. These methods can also be utilized for the synthesis of the polymer component of the component (A).

It is to be noted that in the case of curing the curable resin composition after coating or casting, there may be the case where it is difficult to undergo heating for a reason that high-temperature resistance of a polarizing plate which is used in a liquid crystal panel is low, or other reasons. In that case, it is preferable to use the photopolymerization initiator (C1) that is polymerizable with light.

From the standpoint of more highly suppressing a warp of a protective panel or a substrate of an image display unit or the like, the curing shrinkage ratio in the case of curing the resin composition of the present invention is preferably less than 1.4%, and more preferably less than 1.0%. When the curing shrinkage ratio is less than 1.4%, a warp which may be possibly generated in an image display unit can be thoroughly suppressed, and the generation of inconvenience caused when used for an image display device, such as color unevenness, etc., can be prevented.

A light transmittance of a cured material of the resin composition of the present invention in a film thickness of 175 μm at a wavelength of 400 nm is preferably 90% or more, more preferably 95% or more, and still more preferably 98% or more.

In addition, a haze of the above-described cured material is preferably not more than 1.0%, more preferably not more than 0.7%, and still more preferably not more than 0.4%.

It is to be noted that the light transmittance and haze values of the above-described cured material mean values measured by methods described in the Examples.

[Image Display Device]

A liquid crystal display device that is an example of an image display device which can be manufactured by using the curable resin composition of the present invention is hereunder described.

Figure 1:
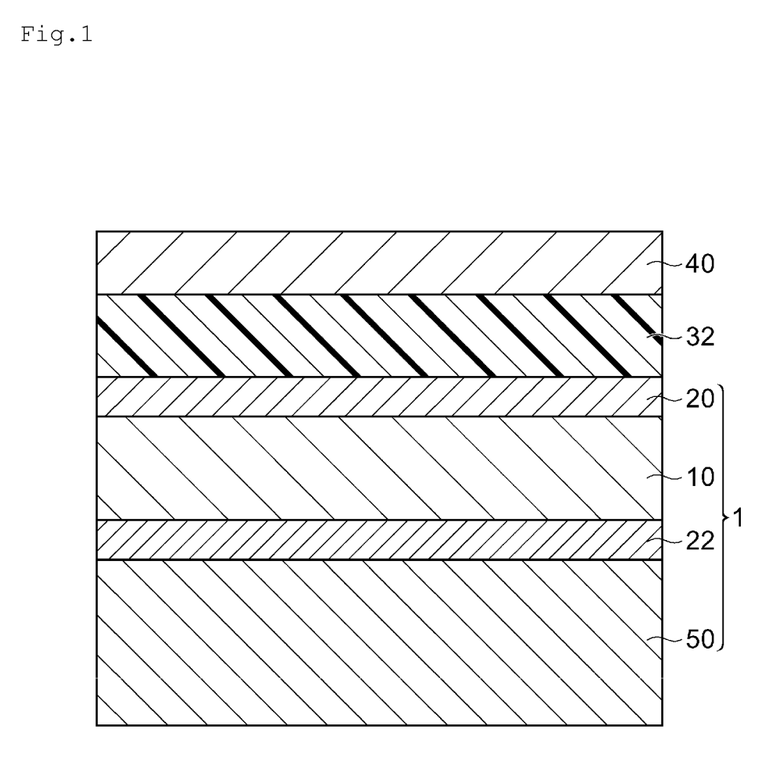
FIG. 1 is a side cross-sectional view schematically showing an embodiment of a liquid crystal display device that is an example of the image display device of the present invention.

FIG. 1 is a side cross-sectional view schematically showing an embodiment of a liquid crystal display device that is an example of the image display device of the present invention. The liquid crystal display device shown in FIG. 1 is configured of an image display unit 1 in which a backlight system 50, a polarizing plate 22, a liquid crystal display cell 10, and a polarizing plate 20 are laminated in this order; a transparent resin layer 32 provided on the upper surface of the polarizing plate 20 working as the viewing side of the liquid crystal display device; and a protective panel 40 provided on the surface thereof. It is to be noted that the transparent resin layer 32 is constituted of a cured material of the liquid curable resin composition of the present invention.

Figure 2:
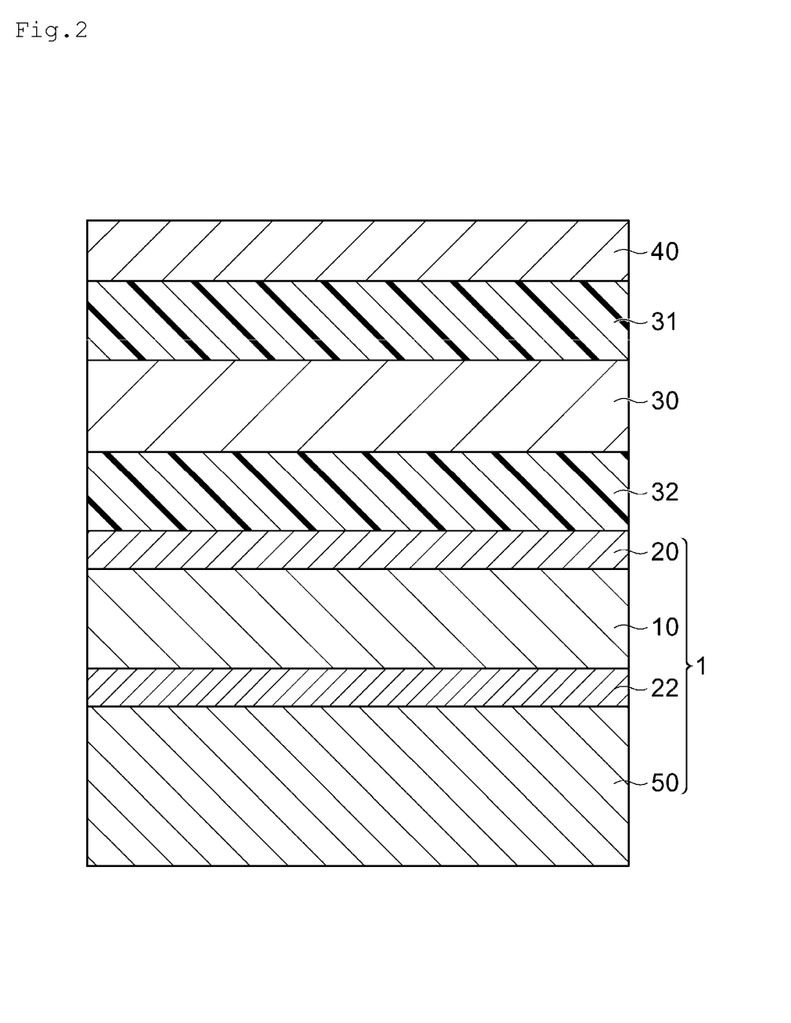
FIG. 2 is a side cross-sectional view schematically showing a touch panel-mounted liquid crystal display device as an embodiment of a liquid crystal display device that is an example of the image display device of the present invention.

FIG. 2 is a side cross-sectional view schematically showing a touch panel-mounted liquid crystal display device as an embodiment of a liquid crystal display device that is an example of the image display device of the present invention. The liquid crystal display device shown in FIG. 2 is configured of an image display unit 1 in which a backlight system 50, a polarizing plate 22, a liquid display cell 10, and a polarizing plate 20 are laminated in this order; a transparent resin layer 32 provided on the upper surface of the polarizing plate 20 working as the viewing side of the liquid crystal display device; a touch panel 30 provided on the upper surface of the transparent resin layer 32; a transparent resin layer 31 provided on the upper surface of the touch panel 30; and a protective panel 40 provided on the surface thereof.

It is to be noted that in the liquid crystal display device of FIG. 2, though the transparent resin layer intervenes both between the image display unit 1 and the touch panel 30 and between the touch panel 30 and the protective panel 40, the transparent resin layer may be enough to intervene in at least one of them. In addition, in the case where the touch panel is of an on-cell type, the touch panel and the liquid crystal display cell are integrated. Specific examples thereof include one in which the liquid crystal display cell 10 of the liquid crystal display device of FIG. 1 is replaced by one of an on-cell type.

According to the liquid crystal display devices shown in FIGS. 1 and 2, since a cured material of the curable resin composition of the present invention is provided as the transparent resin layer 31 or 32, these liquid crystal display devices have impact resistance, and an image which is free from ghost, is clear, and has high contrast is obtained.

For the liquid crystal display cell 10, those constituted of a liquid crystal material which is well-known in the subject technical field can be used. In addition, though liquid crystal display cells are classified into a TN (twisted nematic) mode, an STN (super-twisted nematic) mode, a VA (vertical alignment) mode, an IPS (in-place-switching) mode, or the like depending upon the control method of the liquid crystal material, the liquid crystal display cell in the present invention may be a liquid crystal display cell adopting any control method.

As for the polarizing plates 20 and 22, a polarizing plate which is general in the subject technical field can be used.

The surface of the polarizing plate may be subjected to a surface treatment such as anti-reflection, antifouling, hard coating, etc. The above-described surface treatment may be applied to one surface or both surfaces of the polarizing plate.

In addition, as for the touch panel 30, a touch panel which is generally used in the subject technical field can be used.

The transparent resin layer 31 or 32 can be, for example, formed in a thickness of from 0.02 mm to 3 mm. In particular, the liquid curable resin composition of the present invention is effective for thick films and is suitable in the case of forming the transparent resin layer 31 or 32 of 0.1 mm or more.

As for the protective plate 40, a general optical transparent base material can be used.

Examples of the optical transparent base material include a plate of an inorganic material such as a glass plate, a quartz plate, etc., a resin plate such as an acrylic resin plate, a polycarbonate plate, etc., a resin sheet such as a thick polyester sheet, etc., and the like. Of these, from the viewpoint of having a high surface hardness, a glass plate and an acrylic resin plate are preferable, and a glass plate is more preferable.

It is to be noted that the surface of the protective panel 40 may be subjected to a surface treatment such as anti-reflection, antifouling, hard coating, etc. The above-described surface treatment may be applied to only one surface or both surfaces of the protective panel. In addition, the protective panel can also be used in combination of plural sheets of substrates.

Though the backlight system 50 is not limited with respect to a configuration thereof, in general, it has a reflection means such as a reflection plate, etc. and an illumination means such as a lamp, etc. As for these reflection means and illumination means, known means which are used for usual image display devices can be applied.

[Manufacturing Method of Image Display Device]

The image display devices shown in above-described FIGS. 1 and 2 using the liquid curable resin composition of the present invention can be, for example, manufactured by the following methods.

First of all, the image display device provided with an image display unit and a protective panel, as shown in FIG. 1, can be manufactured through a step of allowing the liquid curable resin composition of the present invention to intervene between the image display unit and the protective panel (hereinafter also referred to as "step (1a)"); and a step of irradiating the side of the protective panel with a light, thereby curing the liquid curable resin composition to form a transparent resin layer (hereinafter also referred to as "step (2a)").

In addition, the image display device provided with an image display unit, a touch panel, and a protective panel, as shown in FIG. 2, can be manufactured through a step of allowing the liquid curable resin composition of the present invention to intervene at least one of between the image display unit and the touch panel and between the touch panel and the protective panel (hereinafter also referred to as "step (1b)"); and a step of irradiating the side of the protective panel with a light, thereby curing the liquid curable resin composition to form a transparent resin layer (hereinafter also referred to as "step (2b)").

In the steps (1a) and (1b), examples of the method of allowing the liquid curable resin composition of the present invention to intervene between the image display unit and the protective panel, or the like include a method in which the subject resin composition is coated on the image display unit or the protective panel by using a dispenser, followed by sticking in vacuo (reduced pressure) or at atmospheric pressure; a method in which the subject resin composition is cast between the image display unit and the protective panel disposed at a fixed interval; and the like.

It is to be noted that at the time of casting the curable resin composition, a dam may be formed in surroundings of the image display unit and the protective panel.

The irradiation with light in the steps (2a) and (2b) is carried out by irradiating active energy rays such as ultraviolet rays, electron beams, α-rays, β-rays, or the like, and, for example, it can be carried out by using an ultraviolet ray irradiation apparatus under a condition at a dose of from 500 mJ/cm$^2$ to 5,000 mJ/cm$^2$.

It is to be noted that the dose referred to herein means a value obtained by multiplying an illuminance measured by an ultraviolet ray illumination meter (trade name: UV-MO2 (light receptor: UV-36), manufactured by Oak Co., Ltd., etc.) by an irradiation time (sec).

Examples of a light source for irradiation with ultraviolet rays include a low-pressure mercury vapor lamp, a medium-pressure mercury vapor lamp, a high-pressure mercury vapor lamp, a metal halide lamp, an LED lamp, and the like. Of these, a high-pressure mercury vapor lamp and a metal halide lamp are preferable.

It is to be noted that in the steps (2a) and (2b), at the time of irradiation with light, irradiation from the protective panel side and irradiation from the side surface may be used in combination. In addition, curing can also be promoted by means of heating of the laminate containing the resin composition or other means simultaneously with irradiation with light.

In the light of the above, while the liquid crystal display device that is one of image display devices which can be manufactured by using the liquid curable resin composition of the present invention has been described, the image display device which can be manufactured by using the liquid curable resin composition of the present invention is not limited thereto. For example, it is also possible to apply the image display device to a plasma display panel (PDP), a cathode ray tube (CRT), a field emission display (FED), an organic EL display, a 3D display, an electronic paper, or the like.

In particular, it is more suitable to fabricate a transparent resin layer by using the liquid curable resin composition of the present invention in an image display device having a size of 10 inches or more.

EXAMPLES

The present invention is more specifically described below with reference to the following Examples, but it should not be construed that the present invention is limited to the following Examples.

Preparation examples of a resin composition which may be used for the image display device to which the present invention is applied are hereunder described. It is to be noted that in the following Examples, the weight average molecular weight is a value measured on the basis of the following method.

[Weight Average Molecular Weight]

The weight average molecular weight was determined by an approximation according to a cubic equation by means of gel permeation chromatography (GPC) by using tetrahydrofuran (THF) as a solvent and also using polystyrene as a standard material. A GPC condition is shown below.

Apparatus:
  Pump: Model L-2130 (manufactured by Hitachi High-Technologies Corporation).
  Detector: Model L-2490 RI (manufactured by Hitachi High-Technologies Corporation)
  Column oven: L-2350 (manufactured by Hitachi High-Technologies Corporation)
Column: "Gelpack GL-R440"+"Gelpack GL-R450"+"Gelpack GL-R400M" (three columns in total) (trade names, manufactured by Hitachi Chemical Company, Ltd.)
Column size: 10.7 mm I.D×300 mm
Eluting solution: Tetrahydrofuran (THF)
Sample concentration: 10 mg/2 mL
Injection amount: 200 μL
Flow rate: 2.05 mL/min
Measurement temperature: 40° C.

Manufacturing Example 1

Synthesis of Polyurethane Acrylate 1

In a reactor equipped with a condenser, a thermometer, a stirrer, a dropping funnel, and an air injection pipe, 520.8 g (0.613 moles) of polytetramethylene glycol (molecular weight: 850) and 1.06 g (0.01 moles) of diethylene glycol as the above-described component (a1), 275.2 g (0.8 moles) of an adduct of 2-hydroxyethyl acrylate with 2 moles of caprolactone (trade name: PLACCEL FA2D, manufactured by Daicel Corporation) as the above-described component (a3), 0.5 g of p-methoxyphenol as a polymerization inhibitor, and 0.3 g of dibutyltin dilaurate as a catalyst were added. After increasing the temperature to 70° C. while allowing air to flow into the reactor, 222 g (1 mole) of isophorone diisocyanate as the above-described component (a2) was uniformly dropped over 2 hours while stirring at 70 to 75° C., thereby carrying out a reaction.

After completion of dropping, the reaction was continued for 5 hours, and when it was confirmed that the isocyanate disappeared by means of IR (infrared absorption analysis) measurement (apparatus name: JIR-6500, manufactured by JEOL Ltd.), the reaction was finished, thereby obtaining Polyurethane Acrylate 1 (weight average molecular weight: 7,000, average number of functional groups=2 (calculated value)) having polytetramethylene glycol and isophorone diisocyanate as repeating units and having an ethylenically unsaturated bond.

Manufacturing Example 2

Synthesis of Polyurethane Acrylate 2

In a reactor equipped with a condenser, a thermometer, a stirrer, a dropping funnel, and an air injection pipe, 520.8 g (0.613 moles) of polytetramethylene glycol (molecular weight: 850) and 1.06 g (0.01 moles) of diethylene glycol as the above-described component (a1), 137.6 g (0.4 moles) of an adduct of 2-hydroxyethyl acrylate with 2 moles of caprolactone (trade name: PLACCEL FA2D, manufactured by Daicel Corporation) as the above-described component (a3), 34.9 g (0.47 moles) of butanol as a blocking agent, 0.5 g of p-methoxyphenol as a polymerization inhibitor, and 0.3 g of dibutyltin dilaurate as a catalyst were added. After increasing the temperature to 70° C. while allowing air to flow into the reactor, 222 g (1 mole) of isophorone diisocyanate as the above-described component (a2) was uniformly dropped over 2 hours while stirring at 70 to 75° C., thereby carrying out a reaction.

After completion of dropping, the reaction was continued for 5 hours, and when it was confirmed that the isocyanate disappeared by means of IR (infrared absorption analysis) measurement (apparatus name: JIR-6500, manufactured by JEOL Ltd.), the reaction was finished, thereby obtaining Polyurethane Acrylate 2 (weight average molecular weight: 7,000, average number of functional groups=1 (calculated value)) having polytetramethylene glycol and isophorone diisocyanate as repeating units and having an ethylenically unsaturated bond.

Manufacturing Example 3

Synthesis of Polyurethane Acrylate 3

In a reactor equipped with a condenser, a thermometer, a stirrer, a dropping funnel, and an air injection pipe, 520.8 g (0.613 moles) of polytetramethylene glycol (molecular weight: 850) and 1.06 g (0.01 moles) of diethylene glycol as the above-described component (a1), 137.6 g (0.4 moles) of an adduct of 2-hydroxyethyl acrylate with 2 moles of caprolactone (trade name: PLACCEL FA2D, manufactured by Daicel Corporation) as the above-described component (a3), 34.9 g (0.47 moles) of butanol as a blocking agent, 0.5 g of p-methoxyphenol as a polymerization inhibitor, and 0.3 g of dibutyltin dilaurate as a catalyst were added. After increasing the temperature to 70° C. while allowing air to flow into the reactor, 209.8 g (1 mole) of TMDI (a mixture of 2,2,4-trimethylhexamethylene diisocyanate and 2,4,4-trimethylhexamethylene diisocyanate, mixing ratio: 4/6 (mass ratio)) as the above-described component (a2) was uniformly dropped over 2 hours while stirring at 70 to 75° C., thereby carrying out a reaction.

After completion of dropping, the reaction was continued for 5 hours, and when it was confirmed that the isocyanate disappeared by means of IR (infrared absorption analysis) measurement (apparatus name: JIR-6500, manufactured by JEOL Ltd.), the reaction was finished, thereby obtaining Polyurethane Acrylate 3 (weight average molecular weight: 7,000, average number of functional groups=1 (calculated value)) having polytetramethylene glycol and TMDI as repeating units and having an ethylenically unsaturated bond.

Manufacturing Example 4

Synthesis of Polyurethane Acrylate 4

In a reactor equipped with a condenser, a thermometer, a stirrer, a dropping funnel, and an air injection pipe, 520.8 g (0.613 moles) of polytetramethylene glycol (molecular weight: 850) and 1.06 g (0.01 moles) of diethylene glycol as the above-described component (a1), 68.8 g (0.2 moles) of an adduct of 2-hydroxyethyl acrylate with 2 moles of caprolactone (trade name: PLACCEL FA2D, manufactured by Daicel Corporation) as the above-described component (a3), 52.3 g (0.71 moles) of butanol as a blocking agent, 0.5 g of p-methoxyphenol as a polymerization inhibitor, and 0.3 g of dibutyltin dilaurate as a catalyst were added. After increasing the temperature to 70° C. while allowing air to flow into the reactor, 209.8 g (1 mole) of TMDI (a mixture of 2,2,4-trimethylhexamethylene diisocyanate and 2,4,4-trimethylhexamethylene diisocyanate, mixing ratio: 4/6 (mass ratio)) as the above-described component (a2) was uniformly dropped over 2 hours while stirring at 70 to 75° C., thereby carrying out a reaction.

After completion of dropping, the reaction was continued for 5 hours, and when it was confirmed that the isocyanate disappeared by means of IR (infrared absorption analysis) measurement (apparatus name: JIR-6500, manufactured by JEOL Ltd.), the reaction was finished, thereby obtaining Polyurethane Acrylate 4 (weight average molecular weight: 7,000, average number of functional groups=0.5 (calculated value)) having polytetramethylene glycol and TMDI as repeating units and having an ethylenically unsaturated bond.

Manufacturing Example 5

Synthesis of NP-15EO-A (Acrylate Modified with Nonylphenol Ethylene Oxide (15 Moles))

In a 4-liter flask installed with a stirrer, a thermometer, an air introduction pipe, and a fractionating column (15 stages), 1,800 g (1.92 moles) of an alcohol modified with 15 moles of p-nonylphenol ethylene oxide, 2,100 g (11 moles) of ethyl acrylate, and 0.57 g of hydroquinone monomethyl ether as a polymerization inhibitor were charged, and the contents were heated and refluxed at normal pressure while blowing dry air at a rate of 100 mL/min, thereby removing the moisture within the system. Subsequently, 16 g of isopropyl orthotitanate (titanium tetraisopropoxide) as a catalyst was added, thereby carrying out an ester interchange reaction. At first, the reaction mixture was heated and refluxed, and the column top temperature of the fractionating column was 100° C. that is a boiling point of ethyl acrylate. However, the column top temperature came closer to a boiling point of an azeotrope of ethanol and ethyl acrylate following the progress of the reaction, and therefore, the reaction was carried out while distilling off ethanol as an azeotrope with ethyl acrylate by regulating a reflux ratio such that the column top temperature was 70° C. About 3 hours after adding the catalyst, the column top temperature started to increase and reached about 90° C., the reflux ratio was gradually increased in conformity therewith, and finally, the reaction was continued at a reflux ratio of 15.

Six hours after starting the reaction, the reaction solution was analyzed by means of liquid chromatography. As a result, the alcohol modified with 15 moles of p-nonylphenol ethylene oxide that is the raw material was not detected, and 97% (area %) of an acrylate modified with 15 moles of nonylphenol ethylene oxide that is the desired product was obtained, and therefore, the reaction was finished. The reaction solution was cooled to 75° C., to which was then added 300 g of a 17% by weight salt solution, whereby the catalyst was hydrolyzed for insolubilization. After allowing the resultant to stand for 30 minutes, the organic layer was taken into an eggplant type flask by means of decantation, the excessive ethyl acrylate was distilled off under reduced pressure by using a rotary evaporator, and the internal solution of the eggplant type flask was filtered by means of suction filtration. As a result, a pale yellow, transparent acrylate modified with 15 moles of nonylphenol ethylene oxide (a compound represented by the foregoing general formula (I) wherein $R^1$ is a hydrogen atom, $R^2$ is a nonyl group, and an average value of n is 15) was obtained. It is to be noted that the yield was 1,826 g (percent yield: 96%).

Manufacturing Example 6

Synthesis of NP-20EO-A (Acrylate Modified with Nonylphenol Ethylene Oxide (20 Moles))

An acrylate modified with 20 moles of nonylphenol ethylene oxide (a compound represented by the foregoing general formula (I) wherein $R^1$ is a hydrogen atom, $R^2$ is a nonyl group, and an average value of n is 20) was obtained in the same manner as in Manufacturing Example 5, except for using an alcohol modified with 20 moles of p-nonylphenol ethylene oxide in place of the alcohol modified with 15 moles of p-nonylphenol ethylene oxide.

Examples 1 to 10 and Comparative Examples 1 to 7

The components (A) to (C) were blended in blending ratios shown in Tables 1 and 2 and then mixed with stirring, thereby preparing liquid curable resin compositions of Examples 1 to 10 and Comparative Examples 1 to 7. It is to be noted that the unit of each of the numerical values with respect to the components (A) to (C) is part by mass.

It is to be noted that the "Polyurethane Acrylates 1 to 4" which are used as the component (A) in Tables 1 and 2 are the polyurethane acrylates synthesized by the methods described in the above-described Manufacturing Examples 1 to 4, respectively.

In addition, "FA-314A", "FA-318A", "FA-310A", "NP-15EO-A", and "NP-20EO-A" which are used as the component (B) are compounds as described below.

FA-314A: A trade name, manufactured by Hitachi Chemical Company, Ltd., which is a compound represented by the foregoing general formula (I) wherein $R^1$ is a hydrogen atom, $R^2$ is a nonyl group, and an average value of n is 4.

FA-318A: A trade name, manufactured by Hitachi Chemical Company, Ltd., which is a compound represented by the foregoing general formula (I) wherein $R^1$ is a hydrogen atom, $R^2$ is a nonyl group, and an average value of n is 8.

FA-310A: A trade name, manufactured by Hitachi Chemical Company, Ltd., which is a compound represented by the foregoing general formula (I) wherein $R^1$ is a hydrogen atom, $R^2$ is a nonyl group, and an average value of n is 1.

NP-15EO-A: An acrylate modified with nonylphenol ethylene oxide (15 moles) synthesized by the method described in Manufacturing Example 5, which is a compound represented by the foregoing general formula (I) wherein $R^1$ is a hydrogen atom, $R^2$ is a nonyl group, and an average value of n is 15.

NP-20EO-A: An acrylate modified with nonylphenol ethylene oxide (20 moles) synthesized by the method described in Manufacturing Example 6, which is a compound represented by the foregoing general formula (I) wherein $R^1$ is a hydrogen atom, $R^2$ is a nonyl group, and an average value of n is 20.

With respect to the prepared liquid curable resin compositions, the following tests were carried out. The results are shown in Tables 1 and 2.

(Viscosity)

A viscosity at 25° C. was measured according to JIS 28803 by using an E-type viscometer (trade name: RE-80L, manufactured by Toki Sangyo Co., Ltd.) and also using a cone rotor (3°×R17.65) under a condition at a number of revolution of 1 rpm and in a sample amount of 1 mL.

(Light Transmittance and Haze)

On a glass substrate of 85 mm long×55 mm wide×0.7 mm thick, a frame-shaped spacer of 175 μm was provided, each of the liquid curable resin compositions of Examples 1 to 10 and Comparative Examples 1 to 7 was coated in the inside of the frame-shaped spacer to form a coating film such that a film thickness after curing was 175 μm, and another glass substrate which was the same as that described above was stuck on the formed coating film. Then, the resultant was irradiated with ultraviolet rays of 2,000 mJ/cm$^2$ by using an ultraviolet ray illumination meter (trade name: ELM-3000B-6N, manufactured by Oak Co., Ltd.), thereby curing the coating film of the curable resin composition. There was thus fabricated a cured material having a film thickness of 175 μm, which was interposed between the two sheets of glass substrates.

A sample for reference interposed between two sheets of glass substrates was fabricated in the same manner as that described above by using each of the liquid curable resin compositions of Examples 1 to 10 and Comparative Examples 1 to 7 such that a film thickness after curing was 20 μm. The sample in which this cured material having a film thickness of 20 μm was interposed between the two sheets of glass substrates was used as a reference, and a light transmittance at a wavelength of 400 nm of the cured material having a film thickness 175 μm and corresponding to the subject reference, which was interposed between the above-described two sheets of glass substrates, was measured by using a spectral photometer (trade name: UV-2400PC, manufactured by Shimadzu Corporation).

In addition, a haze of the cured material having a film thickness 175 μm, which was interposed between the above-described glass substrates, was measured according to JIS K7136 by using a haze meter (trade name: NDH5000W, manufactured by Nippon Denshoku Industries Co., Ltd.).

$$\text{Haze}(\%) = (Td/Tt) \times 100$$

(Here, Td represents a diffuse transmittance, and Tt represents a total light transmittance.)

(Moist Heat Resistance Reliability)

Each of the liquid curable resin compositions of Examples 1 to 10 and Comparative Examples 1 to 7 was used, and the same glass substrate and the coating film were stuck on a 4-inch glass substrate via a spacer of 175 μm. Then, the coating film was cured upon irradiation with ultraviolet rays of 2,000 mJ/cm$^2$ by using an ultraviolet ray irradiation apparatus, thereby obtaining a test piece having a film thickness of 175 μm. This test piece was put into a test tank at 85° C. and 85% RH (relative humidity) for 50 hours, and the presence or absence of the separation and the generation of air bubbles were visually observed and evaluated according to the following criteria.

A: No change by visual inspection.
F: Separation and air bubbles were confirmed by visual inspection.

(Curing Shrinkage Ratio)

With respect to each of the cured materials (resin compositions after curing) having a film thickness of 175 μm, which were the same as in the above-described measurement of light transmittance and haze, and the resin compositions before curing, the specific gravity was measured by using an electronic densimeter (SD-200L, manufactured by Alfa Mirage Co., Ltd.), and a curing shrinkage ratio was calculated according to the following equation and evaluated according to the following criteria.

Curing shrinkage ratio(%)=[(Specific gravity of cured material−Specific gravity of resin composition before curing)/Specific gravity of cured material]×100

A: Less than 1.0%
B: 1.0% or more and less than 1.4%
C, 1.4% or more and less than 1.8%
D: 1.8% or more

TABLE 1

| | Item | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A) | Polyurethane Acrylate 1 (Mw = 7,000, average number of functional group = 2) | — | — | — | — | — | — | 44.78 | — | — | — |
| | Polyurethane Acrylate 2 (Mw = 7,000, average number of functional group = 1) | — | — | 89.55 | — | — | — | — | — | — | — |
| | Polyurethane Acrylate 3 (Mw = 7,000, average number of functional group = 1) | 89.55 | — | — | 44.78 | 89.55 | 89.55 | — | 89.55 | — | 44.78 |
| | Polyurethane Acrylate 4 (Mw = 7,000, average number of functional group = 0.5) | — | 89.55 | — | 44.78 | — | — | 44.78 | — | 89.55 | 44.78 |
| Component (B) | FA-314A | 9.95 | — | 9.95 | 9.95 | — | — | 9.95 | 7.90 | 3.98 | 3.98 |
| | FA-318A | — | 9.95 | — | — | — | — | — | — | — | — |
| | NP-15EO-A | — | — | — | — | 9.95 | — | — | — | — | — |
| | NP-20EO-A | — | — | — | — | — | 9.95 | — | — | — | — |
| | 4-Hydroxybutyl acrylate | — | — | — | — | — | — | — | 1.15 | 2.49 | 2.49 |
| | Acryloyl morpholine | — | — | — | — | — | — | — | 0.90 | 3.48 | 3.48 |
| Component (C) | 1-Hydroxy-cyclohexyl-phenyl-ketone | 0.50 | 0.50 | 0.50 | 0.50 | 0.50 | 0.50 | 0.50 | 0.50 | 0.50 | 0.50 |
| | Content of component (B) (% by mass) | 10.0 | 10.0 | 10.0 | 10.0 | 10.0 | 10.0 | 10.0 | 10.0 | 10.0 | 10.0 |
| Properties | Viscosity of resin composition (mP · s) | 3150 | 3200 | 3150 | 3150 | 3250 | 3300 | 3150 | 3150 | 3150 | 3150 |
| | Light transmittance (% at 400 nm) | 99.5 | 99.0 | 99.5 | 99.3 | 99.2 | 99.5 | 99.2 | 99.2 | 99.5 | 99.3 |
| | Haze (%) | 0.3 | 0.3 | 0.3 | 0.2 | 0.3 | 0.3 | 0.3 | 0.3 | 0.3 | 0.3 |
| | Moist heat resistance reliability | A | A | A | A | A | A | A | A | A | A |
| | Curing shrinkage ratio | B | A | B | A | A | A | B | B | B | B |

TABLE 2

| | Item | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component (A) | Polyurethane Acrylate 1 (Mw = 7,000, average number of functional group = 2) | — | — | — | — | — | 44.78 | — |
| | Polyurethane Acrylate 2 (Mw = 7,000, average number of functional group = 1) | — | — | 89.55 | — | — | — | — |
| | Polyurethane Acrylate 3 (Mw = 7,000, average number of functional group = 1) | 89.55 | — | — | 44.78 | — | — | 44.78 |
| | Polyurethane Acrylate 4 (Mw = 7,000, average number of functional group = 0.5) | — | 89.55 | — | 44.78 | 89.55 | 44.78 | 44.78 |
| Component (B) | FA-310A | 9.95 | 9.95 | 9.95 | 9.95 | — | — | — |
| | 2-Ethylhexyl acrylate | — | — | — | — | 7.91 | 7.91 | 7.91 |
| | 4-Hydroxybutyl acrylate | — | — | — | — | 1.15 | 1.15 | 2.05 |
| | Acryloyl morpholine | — | — | — | — | 0.90 | 0.90 | — |
| Component (C) | 1-Hydroxy-cyclohexyl-phenyl-ketone | 0.50 | 0.50 | 0.50 | 0.50 | 0.50 | 0.50 | 0.50 |
| | Content of component (B) (% by mass) | 10.0 | 10.0 | 10.0 | 10.0 | 10.0 | 10.0 | 10.0 |

TABLE 2-continued

| Item | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Properties | Viscosity of resin composition (mP · s) | 3100 | 3100 | 3100 | 3100 | 3100 | 3000 | 3000 |
| | Light transmittance (% at 400 nm) | 99.5 | 99.0 | 99.0 | 99.3 | 99.2 | 99.5 | 99.3 |
| | Haze (%) | 0.3 | 0.3 | 0.3 | 0.2 | 0.3 | 0.3 | 0.2 |
| | Moist heat resistance reliability | A | A | A | A | A | A | A |
| | Curing shrinkage ratio | D | C | D | D | C | D | D |

From Table 1, the liquid curable resin compositions of Examples 1 to 10 are excellent in transparency and moist heat resistance reliability and low in curing shrinkage ratio with respect to cured materials obtained through curing. Meanwhile, the results revealed that all of the liquid curable resin compositions of Comparative Examples 1 to 7 are large in curing shrinkage ratio as compared with the present Examples.

INDUSTRIAL APPLICABILITY

Since the liquid curable resin composition of the present invention is excellent in transparency and moist heat resistance reliability of a cured material obtained through curing and may also control a curing shrinkage ratio to a low level, it may be suitably applied as a material for the purpose of filling a space between a protective panel and an image display unit or the like in a large-sized image display device.

REFERENCE SIGNS LIST

1: Image display unit
10: Liquid crystal display cell
20, 22: Polarizing plate
30: Touch panel
31, 32: Transparent resin layer
40: Protective panel
50: Backlight system

The invention claimed is:

1. A liquid curable resin comprising
(A) a polymer component containing (A1) a polymer having an ethylenically unsaturated bond in a molecule thereof:
(B) a low-molecular weight monomer having one ethylenically unsaturated group in a molecule thereof; and
(C) a polymerization initiator, wherein
the component (B) contains a compound represented by the follwing general formula (I):

(I)

wherein $R^1$ represents a hydrogen atom or a methyl group: $R^2$ represents an alkyl group having 4 or more carbon atoms: and n represents a number of from 15 to 20, and the content of the component (A) is from 60 to 95% by mass, the of the component (B) is from 5 to 40% by mass, and the content of the component (C) is from 0.01 to 5% by mass, relative to the total amount of the whole components in the liquid curable composition, and wherein the component (A1) is a urethane polymer having a (meth)acryloyl group.

2. The liquid curable resin composition according to claim 1, which does not substantially contain an organic solvent and has a viscosity at 25° C. of from 500 to 5,000 mPa·s.

3. The liquid curable resin composition according to claim 1, wherein the component (A) has a weight average molecular weight of 3,000 or more, and the component (B) has a weight average molecular weight of less than 3,000.

4. The liquid curable resin composition according to claim 1, wherein the content of the component (A) is from 75 to 92% by mass, the content of the component (B) is from 7 to 25% by mass, and the content of the component (C) is from 0.02 to 3% by mass relative to the total amount of the whole components in the liquid curable resin composition.

5. The liquid curable resin composition according to claim 1, wherein the component (A) has an average number of functional groups of from 0.3 to 2.0.

6. A method for manufacturing an image display device provided with an image display unit and a protective panel, which comprises
a step of allowing the liquid curable resin composition according to claim 1, to intervene between the image display unit and the protective panel; and
a step of irradiating the side of the protective panel with a light, thereby curing the liquid curable resin composition.

7. An image display device having a laminate structure including an image display unit having an image display part, a protective panel, and a resin layer that exists between the image display unit and the protective panel, wherein the resin layer is composed of a cured material of the liquid curable resin composition according to claim 1.

8. A liquid curable resin composition comprising
(A) a polymer component containing (A1) a polymer having an ethylenically unsaturated bond in a molecule thereof;
(B) a low-molecular weight monomer having one ethylenically unsaturated group in a molecule thereof; and
(C) a polymerization initiator, wherein
the component (B) contains a compound represented by the following general formula (I):

(I)

wherein $R^1$ represents a hydrogen atom or a methyl group; $R^2$ represents an alkyl group having 4 or more carbon atoms; and n represents a number of from 15 to 20, and the content of the component (A) is from 60 to 95% by mass, the content of the component (B) is from 5 to 40% by mass, and the content of the component (C) is from 0.01 to 5% by mass, relative to the total amount of the whole components in the liquid curable composition.

9. The liquid curable resin composition according to claim 8, which does not substantially contain an organic solvent and has a viscosity at 25° C. of from 500 to 5,000 mPa·s.

10. The liquid curable resin composition according to claim 8, wherein the component (A) has a weight average molecular weight of 3,000 or more, and the component (B) has a weight average molecular weight of less than 3,000.

11. The liquid curable resin composition according to claim 8, wherein the content of the component (A) is from 75 to 92% by mass, the content of the component (B) is from 7 to 25% by mass, and the content of the component (C) is from 0.02 to 3% by mass relative to the total amount of the whole components in the liquid curable resin composition.

12. The liquid curable resin composition according to claim 8, wherein the component (A) has an average number of functional groups of from 0.3 to 2.0.

13. A method for manufacturing an image display device provided with an image display unit and a protective panel, which comprises
   a step of allowing the liquid curable resin composition according to claim 8 to intervene between the image display unit and the protective panel; and
   a step of irradiating the side of the protective panel with a light, thereby curing the liquid curable resin composition.

14. An image display device manufactured by the manufacturing method according to claim 13.

15. A method for manufacturing an image display device provided with an image display unit, a touch panel, and a protective panel, which comprises
   a step of allowing the liquid curable resin composition according to claim 8 to intervene at least one of between the image display unit and the touch panel and between the touch panel and the protective panel; and
   a step of irradiating the side of the protective panel with a light, thereby curing the liquid curable resin composition.

16. An image display device manufactured by the manufacturing method according to claim 15.

17. An image display device having a laminate structure including an image display unit having an image display part, a protective panel, and a resin layer that exists between the image display unit and the protective panel, wherein
   the resin layer is composed of a cured material of the liquid curable resin composition according to claim 8.

18. An image display device having a laminate structure including an image display unit having an image display part, a touch panel, a protective panel, and a resin layer that exists between the touch panel and the protective panel, wherein
   the resin layer is composed of a cured material of the liquid curable resin composition according to claim 8.

* * * * *